Aug. 25, 1925.  1,551,313

L. KOCSIS ET AL

DEVICE FOR AND METHOD OF MAKING DOLL PARTS

Filed Feb. 28, 1925

INVENTOR
Louis Kocsis & Samuel Yagoda
BY
Harry Jacobson
ATTORNEY

Patented Aug. 25, 1925.

1,551,313

UNITED STATES PATENT OFFICE.

LOUIS KOCSIS, OF NEWARK, NEW JERSEY, AND SAMUEL YAGODA, OF BROOKLYN, NEW YORK.

DEVICE FOR AND METHOD OF MAKING DOLL PARTS.

Application filed February 28, 1925. Serial No. 12,192.

*To all whom it may concern:*

Be it known that we, LOUIS KOCSIS and SAMUEL YAGODA, citizens of the United States, residing, respectively, at Newark, in the county of Essex and State of New Jersey, and at Brooklyn, in the county of Kings, State of New York, have invented certain new and useful Improvements in Devices for and Methods of Making Doll Parts, of which the following is a specification.

This invention relates to the method of and the means for making hollow doll parts such as arms, legs and the like. Said parts have heretofore customarily been made solid and are usually manufactured of plastic composition which must be heated in the process of manufacture to prevent sticking to the molds in which it is pressed and which must be baked until it is hard enough to handle without danger of sticking, crushing or breaking.

Our invention contemplates making said parts hollow by the insertion of a heated core into the mold into which the composition has first been inserted, and the removal of said core after said composition is sufficiently baked and compressed to hold its form.

Referring to the drawings—

Figure 1:
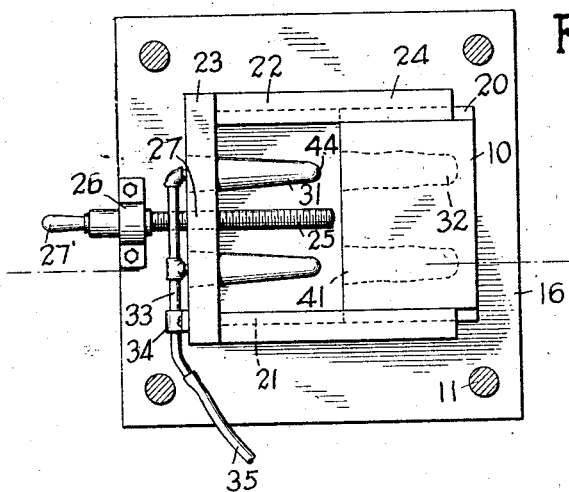
Fig. 1 is a top plan view of one form of our invention.
Figure 6:
Fig. 6 is a perspective view of one of the doll parts which may be made by our improved process and device.
Figure 2:
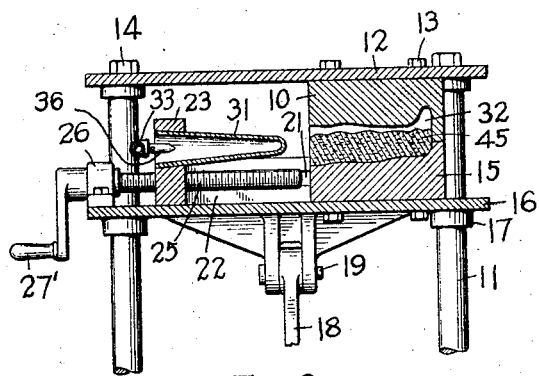
Fig. 2 is a vertical section of the same on line 2—2 of Fig. 1.
Figure 5:
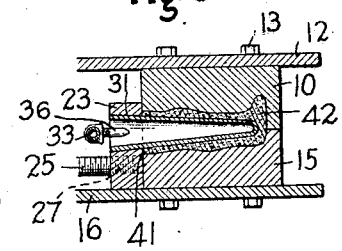
Fig. 5 is a fragmentary view similar to Fig. 2 showing our improved core in operative position.
Figure 4:
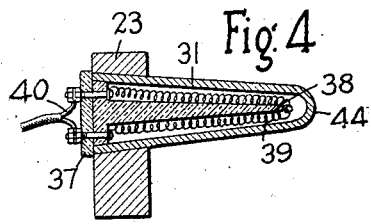
Fig. 4 is a vertical section of a modified form of core in which the heating element is electrical.

In the practical embodiment of our invention as illustrated in connection with a press of any of the well known types, the upper mold member 10 is fixed to the uprights 11 as by means of the plate 12 connected to said mold in any suitable manner as by the bolts 13 and to said uprights by the bolts 14. The lower mold member 15 is fixed to the movable bed 16 having suitable bearings as 17 near the corners thereof, which bearings are slidable on the uprights 11. For vertically reciprocating said bed, a crank or lever 18 may be suitably connected to the under side thereof as at 19, the upper end of said crank or lever being suitably reciprocated vertically by any well known mechanism such as need not be here described in detail.

Said lower mold 15 may be provided with tongues as 20 adapted to enter the grooves 21 of the core carrier 22 whereby said carrier may be guided in its reciprocatory movement toward and from said mold 15. The core carrier 22 consists preferably of the core support 23 and the grooved guides 24 extending therefrom and is adapted to be horizontally reciprocated by any suitable means. One form of said carrier reciprocating means is the screw 25 suitably supported on the bed 16 as by means of the bearing 26, and passing through the suitably threaded hole 27 in the core support 23. A crank as 27' serves to rotate said screw when it is desired to move said carrier.

Figure 3:
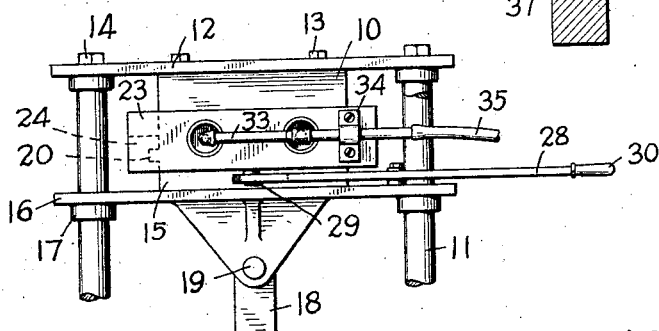
Fig. 3 is an end view of the same showing a modified form of manipulating means.

In that form of our invention shown in Fig. 3, the means for reciprocating the core carrier comprises the hand lever 28, pivoted at a point intermediate of its ends to the bed 16, and pivoted at one extremity thereof to the core support 23 as by means of the slot and pin connection 29. It will be seen that movement of the handle 30 of the lever 28 causes the desired movement of the core carrier 22. It will further be seen that while we have illustrated manually operated means for reciprocating the carrier 22, we contemplate automatically operating the lever 28 or the screw 25 in proper synchronization, by well known mechanism, such as cams, cranks or levers, which form no part of this invention and which need not, therefore be described in detail, and that while we have shown the core as the part which is movable, the mold may be reciprocated instead, if desired, so that the core and mold may be movable relatively to each other in the direction of the axis of said core.

On the core support 23 are mounted one or more preferably hollow and conical cores as 31, smaller in diameter than the assembled or complete mold opening 32, in which the doll part is made. Said core 31 is preferably made hollow so that it may be heated by any suitable means, such as steam, gas or electricity during the operation of our improved device. In Figs. 1, 2, 3 and 5, I have illustrated gas or steam heating means wherein a pipe 33 is carried by a suitable fastening as 34 on the core support 23, said pipe being connected by a flexible hose as 35 to a suitable source of gas or steam, not shown. The nipple or burner 36 serves to carry the steam or gas to the interior of the core 31 whereby said core is maintained at the proper temperature. Any suitable electrical heating unit may be used, if desired, for this purpose in place of the piping just described. One form thereof consists of the plate 37 of insulating material secured to the core support 23 over the open end of the core 31 and carrying the insulating coil supporting element 38 about which a suitable heating coil 39 is mounted. The current carrying wires 40 are suitably connected electrically to the ends of said coil 39.

The operation of our improved mechanism is as follows:

The bed 16 having been brought into its lowermost position by the lever 18, a predetermined quantity of the composition of which doll parts are usually made is placed in the mold member 15, whereafter the bed 16 is carried to its uppermost position (Fig. 2) by the lever 18. It will be noted that in the closed positions of the mold members 10 and 15, the material 45 is substantially uncompressed and may not even fill the mold opening 32.

After the mold members 10 and 15 have been brought together, the heated core 31 is carried into the mold opening 32 by the screw 25 or the lever 28 or by any other suitable manually or automatically operated means operating on the core carrier 22 which is guided in its movement by the tongues 20 sliding in the grooves 21. During its progress into the mold, the core compresses that much of the material which can find a place between the lower half of said core and the mold bottom and forces the surplus material around the upper half of said core into the space between said upper half and the upper mold wall, at the same time forcing as much material into the toe or equivalent portion of the mold opening as can accommodate itself there. When the core has reached its final innermost position in the mold, every part of the mold has been filled with composition under the desired pressure, and any surplus material which cannot be further compressed has been forced out of the open end 41 of the mold opening. It will be understood that the core being heated, the material does not cake on or stick to the core or otherwise retard the core in its inward movement into the mold.

The compressed composition 42 (Fig. 5) is then allowed to bake under the heat of the core until sufficiently caked to allow the removal of the core without injury to the finished work 43, whereafter the core is withdrawn by the screw 25 or the lever 28 as the case may be. It will be seen that by reason of the core being heated, said core may readily be withdrawn from the finished article without danger of injuring said article. The bed 16 is then lowered, the finished article 43 removed from the mold, and the operation repeated.

We prefer to make the core 31 conical in shape for the reasons that not only is the material 45 better compressed and distributed by a core of that shape, but that such shape allows the easy withdrawal of the core from the finished article, though it will be understood that for doll parts of different shape, the shape of the core may be varied to some extent without detracting from the efficiency of our device. The preferably rounded end 44 of the core aids in properly distributing the material in the mold and in preventing sticking of said material to said core, though we do not wish to be understood as limiting ourselves to a core end of that shape.

In the application of our invention to the manufacture of dolls' arms and legs, a hollow arm or leg is produced at a considerable saving of material and of weight. The size of the core is preferably such as will form a doll part of the desired minimum thickness throughout, though certain portions of the part may be somewhat thicker than others. It will be noted that a comparatively thin layer of material is compressed between the core and the mold walls and that less pressure on the material is, therefore, required to produce a homogeneous part than would be the case were the part made solid or without the use of a core. It will further be noted that there being less material to be baked or heated, the baking time may be materially reduced over that required in making a solid part, and that by the use of our improved method, the entire part may be made in a single piece instead of making each half separately and then gluing the halves together.

It will be understood that heat may also be applied to the molds in a manner well known in the art, if desired, that our device may be operatively connected to any suitable press adapted to make doll parts instead of the particular machine illustrated, that the molds and the core may be made to operate in proper synchronization automatically instead of manually, as illustrated, that said core and mold may be moved relatively by means other than that illustrated, that any heating means may be employed in place of that illustrated, that parts other than the legs illustrated may be made by the use of our improved method and mechanism, and that various other changes may be made without departing from the spirit or scope of our invention.

We claim:

1. The method of making hollow doll parts closed at one end of composition, comprising partly filling an open mold member with said composition, closing the mold to form a mold cavity open at one end, moving a core passed through the open end of said mold in a direction effective to spread and compress said composition into all parts of said mold, heating said core continuously, allowing the heated core to remain in the mold until the composition has set, and removing the product from the mold.

2. The method of making hollow doll parts closed at one end of composition consisting of filling an open split mold with said composition under comparatively little pressure, closing the mold to form a mold cavity open at one end, forcing said composition away from the central portion of said mold and into the remainder of said mold, simultaneously heating and compressing said composition, opening said split mold after said composition has set, and removing the product from the mold.

3. In a mechanism for making doll parts, a split mold, a hollow conical core closed at one end, means for continuously heating said core, and means for moving said core and said mold relatively for compressing the material in said mold against the walls of said mold, and for separating said core and said mold.

4. The method of making hollow doll parts of composition consisting of filling a split mold with said composition under comparatively little pressure, forcing said composition away from the central portion of said mold and into the remainder of said mold, simultaneously heating and compressing said composition, opening said split mold after said composition has set, and removing the product from the mold.

5. In a mechanism for making doll parts, a split mold, a hollow heated core, and means for moving said core axially into said mold for compressing the material in said mold against the walls of said mold, and for withdrawing said core from said mold.

6. In combination with a mold for making hollow doll parts closed at one end, a heated conical core closed at one end for forming a conical recess closed at one end in said doll parts, and means for axially moving said core relatively to said mold for causing said core to partially enter said mold.

7. The combination with a split mold for making hollow composition doll parts closed at one end, of an internally recessed conical core closed at one end and open at the other end, means for continuously heating said core through the open end of said core, a rounded outer surface at the closed end of said core, said closed end being of less diameter than said open end and means for moving said core and said mold relatively longitudinally of said core for simultaneously heating and compressing the composition in said mold.

8. The combination with a split mold for making hollow doll parts closed at one end of composition, of a hollow conical core open at one end, means for continuously heating said core through the open end thereof, means for axially reciprocating said core and said mold relatively to each other, and means for opening and closing said mold.

9. The combination with a mold for making hollow doll parts of a core of substantially less diameter than that of the opening in said mold, means for continuously heating said core, and means for axially reciprocating said core into and out of said mold.

10. The combination with a mold for making hollow doll parts closed at one end of a hollow conical core of substantially less diameter than that of the opening in said mold and open at one end thereof, a rounded end on said core, means for continuously heating the inner surface of said core through the open end thereof and means for reciprocating said core and said mold relatively to each other.

11. The combination with a split mold for making hollow composition doll parts, of a hollow conical core closed at one end and open at the other end of substantially less diameter than that of the opening in said mold, means for continuously heating said core, means for axially reciprocating said core into and out of said mold in the closed position of said mold, means for guiding said core in the axial movement thereof, and means for opening and closing said mold when said core is inoperative.

12. In a machine of the character described, a bed, a grooved core carrier mounted on said bed, a hollow conical core carried by said carrier, a rounded end on said core, means movable with said core for continuously heating the inner surface of said core, a lower mold member on said bed, tongues on said member slidable in the grooves of said carrier, a stationary upper mold member, means for reciprocating said bed vertically for bringing said mold members together to close said mold, and for separating said members, and means for axially reciprocating said core horizontally into and out of the mold opening in said members in the closed position of said members.

LOUIS KOCSIS.
SAMUEL YAGODA.